No. 792,620. PATENTED JUNE 20, 1905.
T. RYAN.
SEED DROPPING MECHANISM.
APPLICATION FILED MAR. 29, 1905.

Witnesses
Edwin L. Jewell
W. M. Fairfax

Inventor
Timothy Ryan
By Geo. E. Whiteman
Attorney

No. 792,620.

Patented June 20, 1905.

UNITED STATES PATENT OFFICE.

TIMOTHY RYAN, OF LOVELAND, IOWA.

SEED-DROPPING MECHANISM.

SPECIFICATION forming part of Letters Patent No. 792,620, dated June 20, 1905.

Application filed March 29, 1905. Serial No. 252,689.

*To all whom it may concern:*

Be it known that I, TIMOTHY RYAN, a citizen of the United States, residing at Loveland, in the county of Pottawattamie and State of Iowa, have invented new and useful Improvements in Seed-Dropping Mechanism, of which the following is a specification.

This invention relates to agricultural machines; and its object is to provide a corn-planter with a device for positively forcing the seed from the pockets in the revolving feeding-disk down into the tube that conveys it to the ground. Heretofore there has been provided for this purpose a seed-ejector wheel loosely mounted on a short shaft and adjacent to the disk, so that the teeth of the wheel enter the holes or pockets in said disk, being of such a length that they pass through said holes, and thus act positively to force the seed through the holes.

Since the seed-ejector wheel is rotated by the engagement of its teeth with the holes in the disk, said teeth must be so spaced that they will enter every hole in the disk as it comes along, and therefore the rate of feeding depends solely on the speed at which the disk is revolved. My invention aims to provide a device of this character in which the rate of feeding can be varied without changing the speed of the machine. I do this by securing the seed-ejector wheel rigidly to the shaft that drives the disk and providing said wheel with one, two, or more teeth, as may be desired, so that the teeth enter only a part of the holes in the disk, if preferred, and thus the rate of feeding is less than when they enter every hole. I also arrange the parts so that the shaft can be tilted up and the wheel removed when it is desired to change it in order to change the rate of feed.

Figure 1:
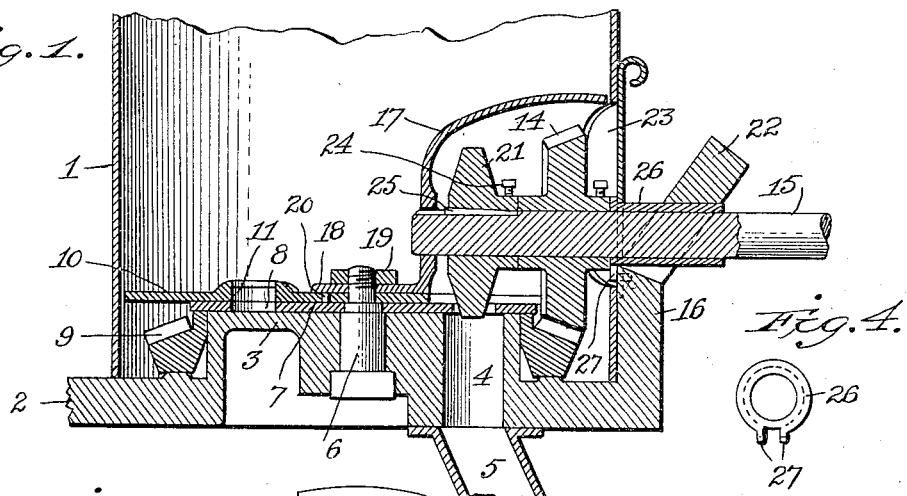
Figure 4:
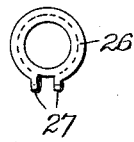
Figure 2:
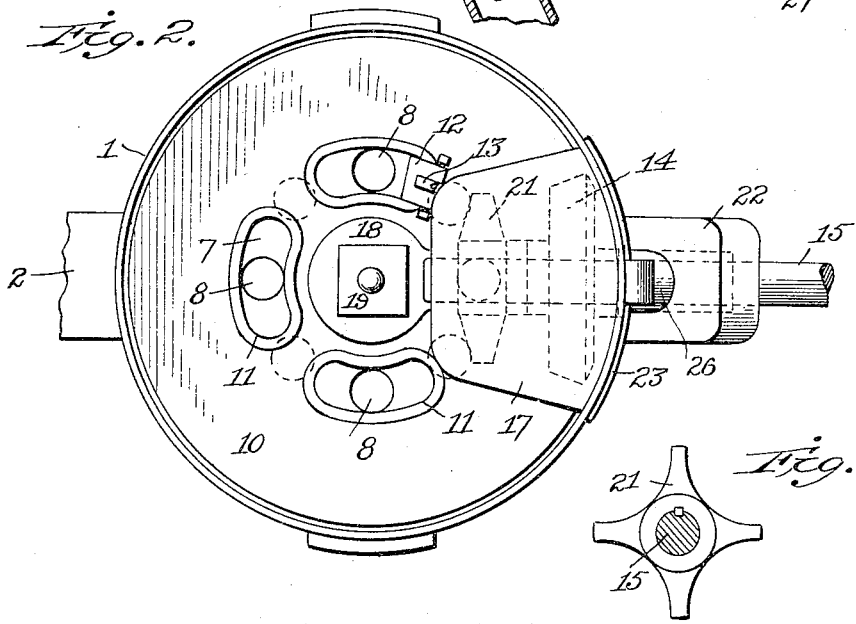
Figure 3:
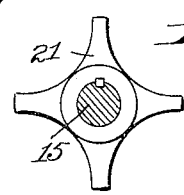
Figure 5:
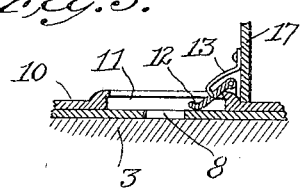

In the accompanying drawings, Figure 1 is a sectional elevation of a portion of the seed-dropping mechanism of a corn-planter equipped with my improved seed-ejector wheel. Fig. 2 is a top plan view of the same. Fig. 3 is an end view of one of the wheels. Fig. 4 is an end view of the sleeve for the shaft, and Fig. 5 is a sectional elevation of the seed brush or wiper.

The hopper 1 rests on a frame 2, which has a raised circular table 3, containing a discharge-opening 4, communicating with a seed-spout 5. A bolt 6 passes centrally through the table and serves as a pivot for the seed-disk 7, which rests on the table and has a plurality of holes or seed-cavities 8, in which the seed lodges and by which it is carried to the discharge-opening 4 when said disk is revolved. Attached to the periphery of the disk is a depending annular bevel-gear 9, concentric with the table and the pivot-bolt.

A plate 10 covers the greater part of the seed-disk and prevents the seed from clogging the gear. The plate has slots 11 to permit the seed to enter the seed-cavities in the disk. In order to remove the surplus seed, a brush or wiper 12 is pivoted at one end of a slot 11, with a spring 13 for holding it down, but permitting it to yield upwardly to avoid cracking or injuring a large grain.

The gear and disk are rotated by a bevel-pinion 14, secured to a shaft 15, which has a bearing in a bracket 16 outside the hopper and in a shield 17 inside the hopper, said shield covering the bevel-pinion and the seed-disk where the latter is not covered by the plate 10. The shield is secured to the plate 10, preferably by a foot 18, through which the pivot-bolt passes, a nut 19 on the latter holding the parts together. The foot may have a stud 20 entering a socket in the plate to aid in positioning these parts.

Removably secured to the shaft inside the hopper is a sprocket seed-ejector wheel 21, having one or more teeth, as desired, of a length sufficient to pass through the holes 8. The teeth are so spaced that they will engage said holes as the disk revolves, and thus force the seed down into the tube. If the pinion has half as many teeth as the gear and there are eight holes in the disk spaced at equal angular distances apart, then a seed-ejector wheel with four teeth, as shown in Fig. 3, will engage every hole 8 as it comes under the shaft. Similarly a seed-ejector wheel with two teeth will engage only half of the holes, and one with one tooth would force the seed from only two of the holes in one revolution of the disk. It will of course be understood that the only seed that can pass under the shield is that contained in the holes 8.

In order to permit the seed-ejector wheel to be taken off and a different one put in its place, the outer bearing for the shaft is formed in an outwardly-inclined arm 22 of the bracket 16, so as to enable the shaft to be tipped up when released from the inner bearing. To accomplish this, it is necessary to unfasten and lift off the shield, which can be readily done on removing the nut 19. The slide 23 is then raised and the shaft is free to be tipped up. By slacking off the set-screw 24 and removing the key 25 the seed-ejector wheel can be pulled off and a new one substituted for it.

To avoid wear on the shaft where it passes through the bearing in the inclined arm, a sleeve 26 is fitted on the shaft, said sleeve having a laterally-projecting lug or lugs 27 engaging with recesses in the arm to keep the sleeve from rotating with the shaft. It will be seen that this device affords a convenient means for varying the rate of feed of a seed-dropping mechanism and one that is simple and not liable to get out of order.

Having thus described my invention, what I claim is—

1. In a seed-dropping mechanism, the combination with the hopper and the rotatable seed-disk, of a shaft for rotating the same, and a seed-ejector wheel secured to said shaft.

2. In a seed-dropping mechanism, the combination with the hopper and the rotatable seed-disk, of a shaft for rotating said disk, and a seed-ejector wheel removably secured to said shaft.

3. In a seed-dropping mechanism, the combination with the rotatable seed-disk, of changeable seed-ejector wheels for varying the rate of feed.

4. In a seed-dropping mechanism, the combination with the seed-disk, of a bevel-gear attached thereto, a bevel-pinion meshing with said gear, a seed-ejector wheel mounted on the same shaft as the pinion, an outer bearing arranged to permit the shaft to be tipped, and an inner bearing adapted to be released from said shaft.

5. In a seed-dropping mechanism, the combination with the seed-disk, of a stud on which it is rotatable, a plate secured to said stud above said disk, a shield on said plate, a bracket having an inclined arm, a shaft journaled in said arm and shield, and a seed-ejector wheel removably secured to said shaft and engaging with said disk.

6. In a seed-dropping mechanism, the combination with the seed-disk, of a stud on which it is rotatable, a plate secured to said stud above said disk, a shield on said plate, a bracket having an inclined arm, a shaft journaled in said arm and shield, a seed-ejector wheel removably secured to said shaft and engaging with said disk, and a stationary sleeve surrounding said shaft in its bearing in said arm.

In testimony whereof I have signed my name to this specification in the presence of two subscribing witnesses.

TIMOTHY RYAN.

Witnesses:
W. D. CODY,
W. J. BURK.